United States Patent
Ho

(10) Patent No.: US 7,182,211 B2
(45) Date of Patent: Feb. 27, 2007

(54) UNIVERSAL RACK

(76) Inventor: Yick Wah Ho, Room C, 12/F, Block 5 Prime View Garden, Tuen Mun, N.T. (HK)

( * ) Notice: Subject to any disclaimer, the term of this patent is extended or adjusted under 35 U.S.C. 154(b) by 405 days.

(21) Appl. No.: 10/288,735

(22) Filed: Nov. 5, 2002

(65) Prior Publication Data
US 2004/0055985 A1 Mar. 25, 2004

(30) Foreign Application Priority Data
Sep. 2, 2002 (HK) .......................... 02100794

(51) Int. Cl.
*A47B 57/00* (2006.01)

(52) U.S. Cl. .......................... 211/189; 403/263
(58) Field of Classification Search .................. 211/189, 211/182, 191, 190, 192, 206; 403/231, 263, 403/264
See application file for complete search history.

(56) References Cited

U.S. PATENT DOCUMENTS

| | | | | | |
|---|---|---|---|---|---|
| 3,858,988 | A | * | 1/1975 | Cohen | 403/18 |
| 4,342,397 | A | * | 8/1982 | Halstrick | 211/191 |
| 4,632,473 | A | * | 12/1986 | Smith | 312/265.1 |
| 5,052,565 | A | * | 10/1991 | Zachrei | 211/182 |
| 6,682,253 | B2 | * | 1/2004 | Binna et al. | 403/263 |

* cited by examiner

*Primary Examiner*—Peter M. Cuomo
*Assistant Examiner*—Sarah Purol
(74) *Attorney, Agent, or Firm*—Anderson Kill & Olick, PC

(57) ABSTRACT

The present invention discloses a universal rack, comprises a plurality of upright posts and a plurality of cross bars securely joined together via one-way connecting pieces, two-way connecting pieces and three-way connecting pieces. The universal rack of the present invention can be randomly designed and assembled according to the pattern of space to form a storing shelf of all sorts of different shapes. After assembling, said universal rack can be randomly dissembled. Meanwhile, transformation on single layer can be held when the universal rack is carrying things, and said universal rack can be assembled and disassembled without any tools and other attachments.

10 Claims, 5 Drawing Sheets

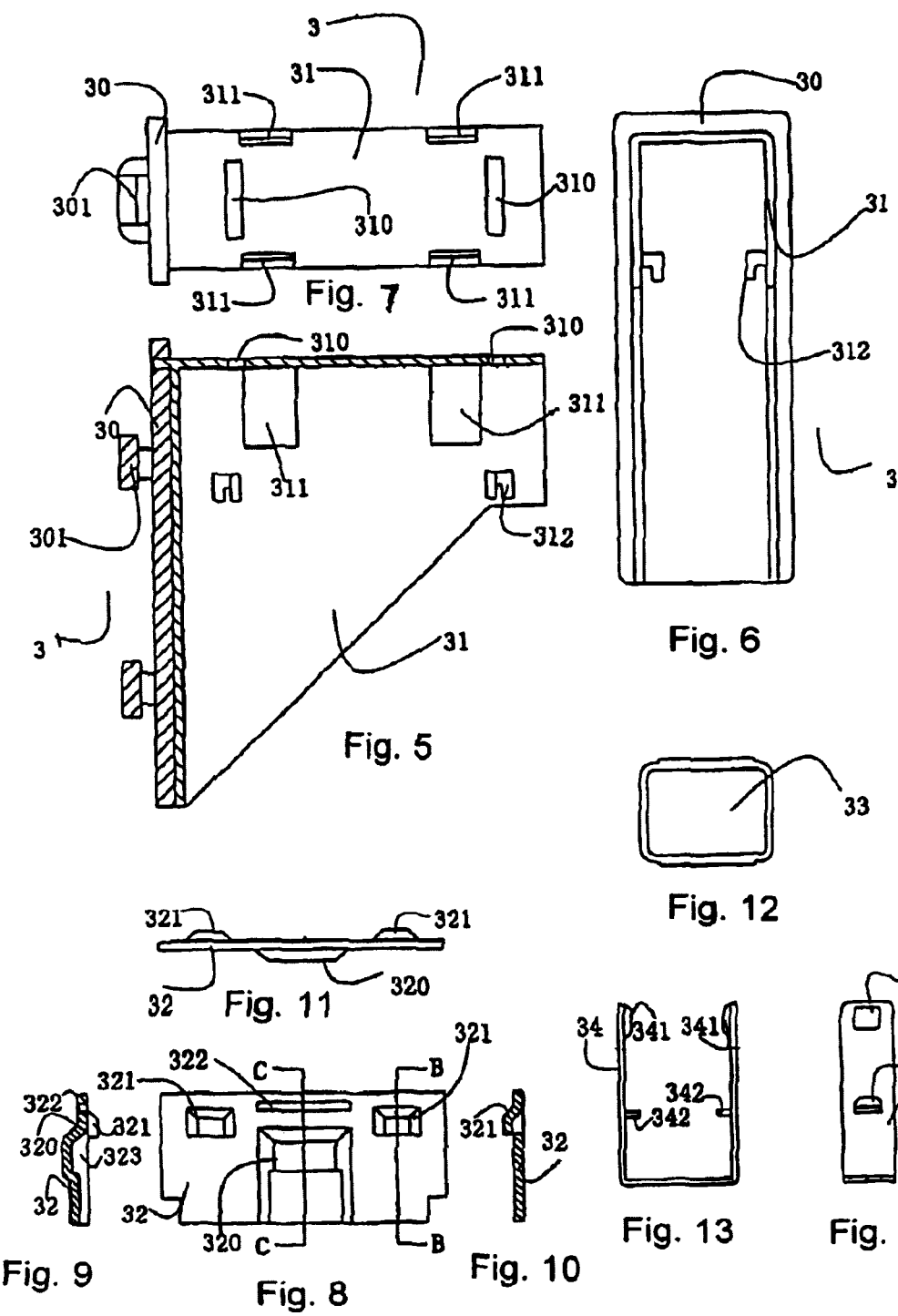

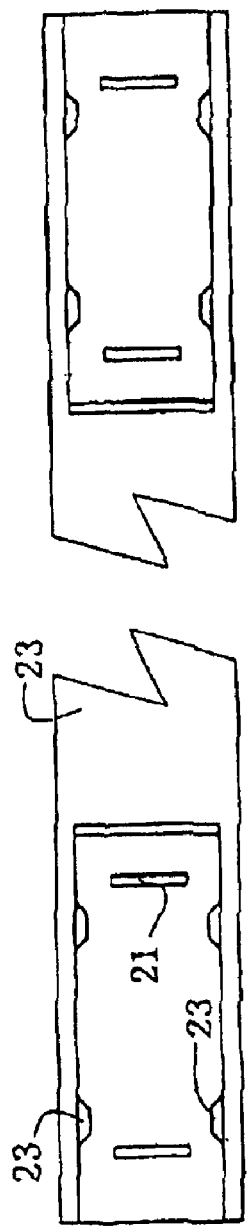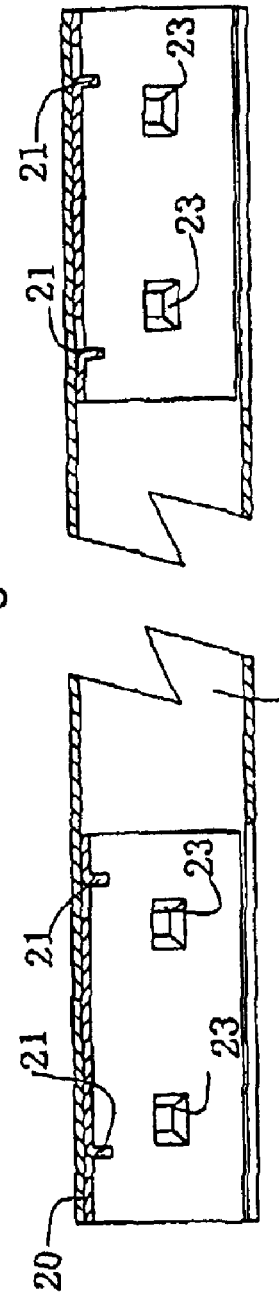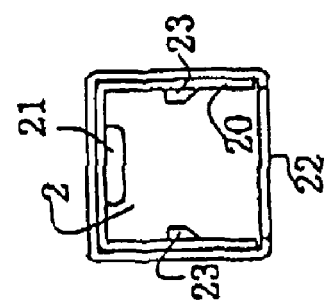

UNIVERSAL RACK

TECHNICAL FIELD

The present invention relates to a storing rack, more particularly, to a universal rack that can be assembled into all sorts of structures.

BACKGROUND ART

Currently along with the development of the society, for continuously reconstruction of the urban areas, the phenomenon of moving homes, factories or offices often happens. During each moving process, the size and pattern of the former and latter rooms are different. Hence, the storing cases, desks, combo boxes and etc. that are not adapted to the space configuration of the new rooms would have to be abandoned. Because of the frequent moving, many abandoned furniture and shelves are still very new, totally reusable. Yet, they have to be abandoned because they cannot fit into the new room configuration. That leads to the increasing cost of moving.

In addition, currently the sizes of the wooden furniture, metal shelves in the market are fixed. If the user wants to fit the furniture with the room design, made-to-order furniture would be required; yet the made-to-order furniture may not form a complete set with other furniture, thus affects the appearance of the room. Hence, that furniture still has to be abandoned during next moving.

Thus, researches and developments have been held regarding the aforesaid deficiency. At last, the present invention proposes a universal rack that can fit to any room configuration, and can be disassembled and assembled into different structures.

SUMMARY OF THE INVENTION

The universal rack of the present invention aims at solving the problems of the existing furniture of not adapting to different sizes of room configuration and inconvenient to dissemble and assemble.

The universal stand of the present invention comprises a plurality of upright posts and a plurality of cross bars, which are securely joined together by connecting pieces. Said upright posts and cross bars are hollow tubes, wherein said upright posts are provided with a plurality of holes on the side walls. The cross section of the two ends of said cross bars are in inverted U-shape. The ends of said cross bars are provided with downward protruding retainers on the interior surface of the upper sidewall and inward protruding protrusions on the interior surface of the two sidewalls. Said connecting pieces all comprise frames, push rods, retaining plates and spring pieces, wherein:

A connecting panel is securely joined to the ends of said frames and having a plurality of protrusions thereon which can be snapped right into the holes on the side walls of the upright posts; recesses are provided on the top surface of said frame which said recesses would engage with the protruding retainers provided on the interior top surface of the cross bars when said frame secures with the cross bars; and holes are provided on the interior surface of the two side walls of the frames, said holes engage with the protrusions on the interior surface of the two side walls of said cross bars, meanwhile bosses are provided on the two side walls of said frames, for securing on said retaining plates.

Protrusions protruding in opposite direction from said bosses on the side of the ends of said frame are provided on both ends of said retaining plates. When said retaining plates engages with the frame, said protrusions would engage with the holes provided on said frame. Meanwhile, a protrusion is provided inward from the middle of said retaining plate, which is in the effect of the sidewall of the frame, to fix said push bar. At the same time, the top of said retaining plates are interconnected via the spring piece.

In addition, screws for regulating the height are provided on the bottom of said upright posts so as to adapt to sites with slightly uneven ground.

In addition, a reinforcing panel is welded on the interior surface of the upper side wall at the ends of said cross bar. Two parallel downward protruding retainers are provided on said reinforcing panel, and two recesses are provided on the upper top surface of said frame corresponding to said two protruding retainers.

In addition, said connecting panels can be flat panels provided with two protrusions thereon having the same spacing as the holes on the sidewall of said upright posts.

In addition, said connecting panels can be L-shaped panels with two protrusions provided on one side so that said two protrusions have the same spacing as the holes on the sidewall of said upright posts.

In addition, said connecting panels can be U-shaped panels with two protrusions provided inside the bottom thereof which said two protrusions have the same spacing as the holes on the sidewall of said upright posts.

In addition, said spring pieces are frame-shaped spring pieces.

In addition, the cross section of said push bars are U-shaped with two opposing protrusions on from the interior surface of the two sidewalls. Meanwhile, two opposing backstops are correspondingly provided below said two protrusions.

In addition, said upright posts, cross bars, connecting pieces are all made of metallic material.

Utilizing the universal rack of the present invention, the users not only can design the shelf by their own according to their needs, but can also design the storing shelf by their own into different sizes and shapes according to the room. Moreover, the universal rack of the present invention can be assembled and dissembled without any tools, techniques and other auxiliary means. It can also be dissembled and assembled at any moment.

BRIEF DESCRIPTION OF FIGURES

The specific embodiments of the present invention will be further illustrated in details accompanying with the figures hereunder.

FIG. 5 is the cross sectional schematic view of the frame of the present invention;

FIG. 6 is the side schematic view of the frame shown in FIG. 5;

FIG. 7 is the top schematic view of the frame shown in FIG. 5;

FIG. 8 is the front schematic view of the retaining plate of the present invention;

FIG. 9 is the cross sectional schematic view of retaining plate shown in FIG. 8 along C—C line;

FIG. 10 is the cross sectional schematic view of retaining plate shown in FIG. 8 along B—B line;

FIG. 11 is the top schematic view of retaining plate shown in FIG. 8;

FIG. 12 is the structural schematic view of the spring piece of the present invention;

FIG. 13 is the front schematic view of the push rod of the present invention;

FIG. 14 is the cross sectional schematic view of the push rod of the present invention;

FIG. 15 is the cross sectional schematic view of the cross bar of the present invention;

FIG. 16 is the side schematic view of the cross bar shown in FIG. 15;

FIG. 17 is the bottom schematic view of the cross bar shown in FIG. 15;

DETAILED DESCRIPTION FOR THE PREFERRED EMBODIMENTS

Figure 24:
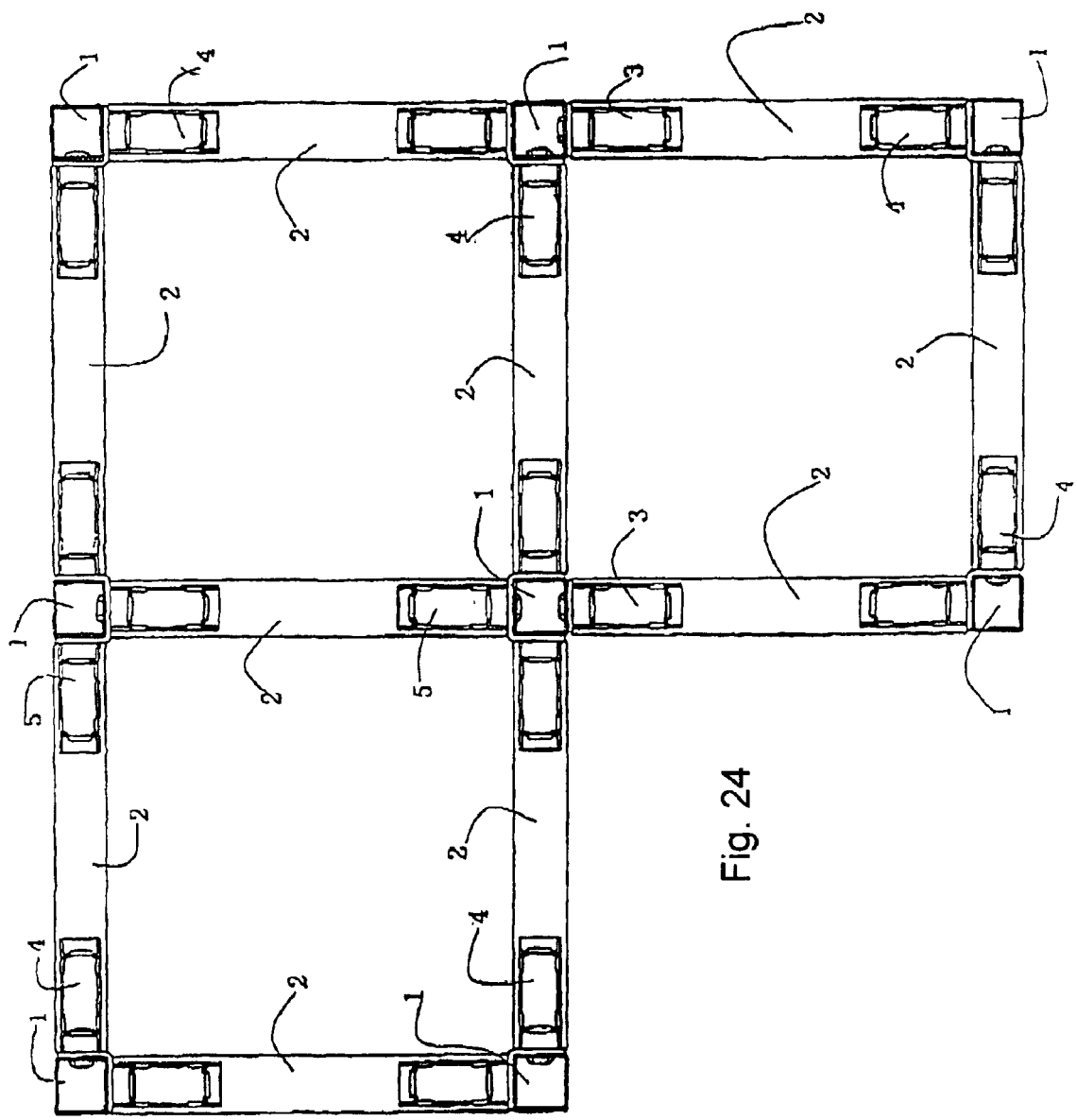
FIG. 24 is the view of the embodiment of the universal rack of the present invention.

As shown in FIG. 24, the universal rack of the present invention comprises a plurality of upright posts 1 and cross bars 2 of different lengths, several one-way connecting pieces 3, several two-way connecting pieces 4, several three-way connecting pieces 5. The upright posts 1 and cross bars 2 can be composed into a variety of storing shelves with different shapes and structures via such three different connecting pieces 3, 4, 5. Said storing shelf can be assembled according to the size and pattern of the room space. Further, it can be taken down and reassembled to adapt the pattern and space of the new room, thus forms a storing shelf of all sorts of sizes and shapes.

As shown in FIGS. 1 to 4, the upright post 1 can be one of a plurality of square hollow tubes of different lengths. A plurality of holes 10 with equal spacing are provided on the sides of said square hollow tube 1 for engaging with the connecting pieces 3, 4, 5. Meanwhile, a screw is installed on the bottom of said square hollow tube 1 for regulating the height to fit into any sites.

As shown in FIGS. 15, 16 and 17, the cross bar 2 can be one of a plurality of square hollow tubes of different lengths. The cross section of both ends of said square hollow tube 2 are inverse U-shaped, i.e. a port 22 is respectively provided on the lower walls at the ends of the cross bar 2. A reinforcing panel 20 is securely joined to the interior tube wall at the ends of the cross bar 2. Two parallel downward protruding retainers 21 are provided on the top surface of said cross bar 2, while two inward protruding protrusions 23 are provided on the two side walls of said cross bar. By means of said two protruding retainers 21 and said four protrusions 23 engages with the connecting pieces 3, 4 or 5 and further connects to the upright post 1, a storing shelf of all sorts of shapes and sizes thus forms.

The connecting pieces of the present invention comprise three types of connecting pieces: one-way connecting pieces 3, two-way connecting pieces 4, three-way connecting pieces 5. Each type of connecting pieces also comprises connecting panels 30, frames 31, retaining plates 32, spring pieces 33 and push rods 34, wherein the connecting panels 30 of the single connecting pieces 3 are flat panels as shown in FIGS. 5–7, with two protrusions 301 provided on one side thereof. The spacing between said two protrusions 301 are equal to the spacing between the holes 10 provided on the sidewalls of the upright posts 1. Meanwhile, a frame 31 is securely joined to the other side of said flat panel 30. Two holes 310 are provided on the top of said frame 31, which can be engaged right with the protruding retainers 21 on the inside top of the ends of the cross bars 2. Two recesses 311 are provided on the two sides of the frame 31, which can be engaged with the protrusions 23 on the two side walls of both ends of the cross bars 2. Meanwhile, two bosses 312 are also provided on the two sidewalls of said frame 31 for engaging with the retaining plates 32.

As shown in FIGS. 8–11, the retaining plates 32 are two opposing flat panels with protrusions 320 protruding outward from the middle thereof. Two protrusions 321 protruding from opposite direction are provided on both sides of said protrusion 320. When the retaining plate 32 engages with the frame 31, said two protrusions 321 would directly be snapped on the recesses 311 provided on the two side walls of the frame 31, and staggered with the protrusion 22 on the cross bars 2. As shown in FIG. 8, a recess 322 is provided on top of the retaining plate 32 for holding the spring piece 33 so as to provide a thrust force towards the retaining plate 32. As shown in FIG. 12, said spring piece 22 is a frame-shaped spring piece.

As shown in FIGS. 13 and 14, the push rod 34 is U-shaped, and provided with two protrusions 341 on the interior sidewall. When said push rod 34 assemblies with the retaining plate 32 and the frame 31, said two protrusions 341 fit right into the grooves 323 formed on the back of the protrusions 321 of the retaining plate 32, as shown in FIG. 9. Meanwhile, two opposing backstops 342 form on the interior sidewall of said push rod 34 for positioning the push rod 34.

Figure 18:
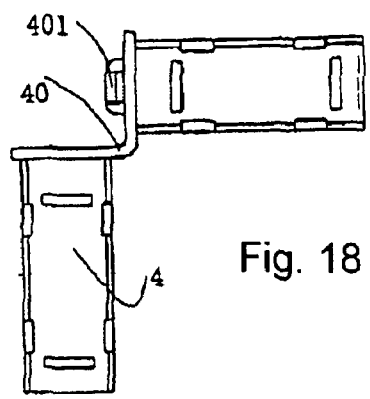
FIG. 18 is the top schematic view of the two-way connecting piece of the present invention.
Figure 20:
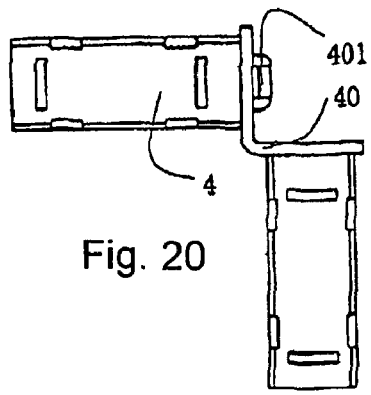
FIG. 20 is the top schematic view of another embodiment of the two-way connecting piece of the present invention.
Figure 19:
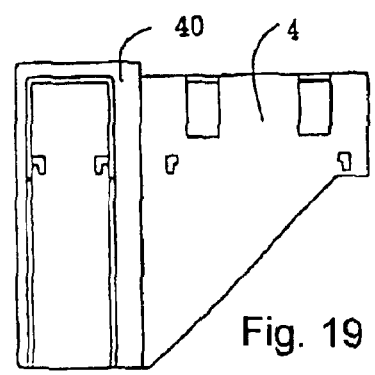
FIG. 19 is the front schematic view of the two-way connecting piece shown in FIG. 18.
Figure 21:
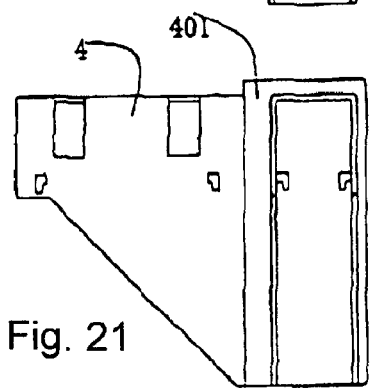
FIG. 21 is the front schematic view of the two-way connecting piece shown in FIG. 20.
Figure 22:
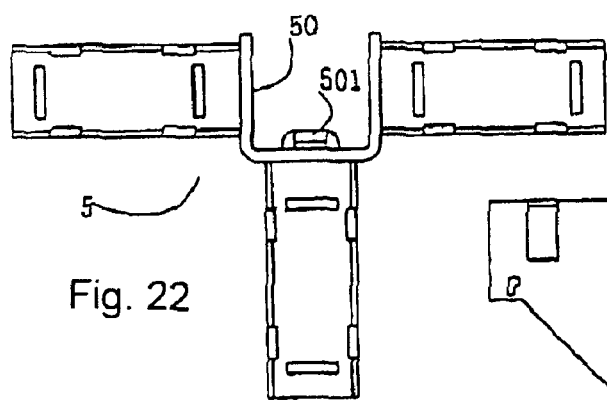
FIG. 22 is the top schematic view of the three-way connecting piece of the present invention.
Figure 23:
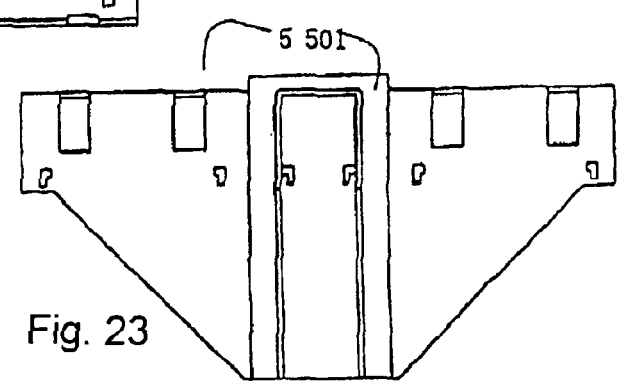
FIG. 23 is the front schematic view of the three-way connecting piece shown in FIG. 22.

As shown in FIGS. 18 and 21, the connecting panel 40 of the two-way connecting piece 4 is L-shaped, and provides with two protrusions 401 on one side thereof The spacing between said two protrusions 401 is equal to the spacing between the holes 10 provided on the side walls of the upright post 1, thus the two-way connecting piece 4 can be fitted right into the holes 10 of the upright posts 1 and securely joined to the upright posts 1. The connecting panel 50 of the three-way connecting piece 5 is U-shaped as shown in FIGS. 22 and 23, with two inward protrusions 501 are provided at the middle thereof for engaging with the holes 10 provided on the side walls of the upright post 1.

Figure 1:
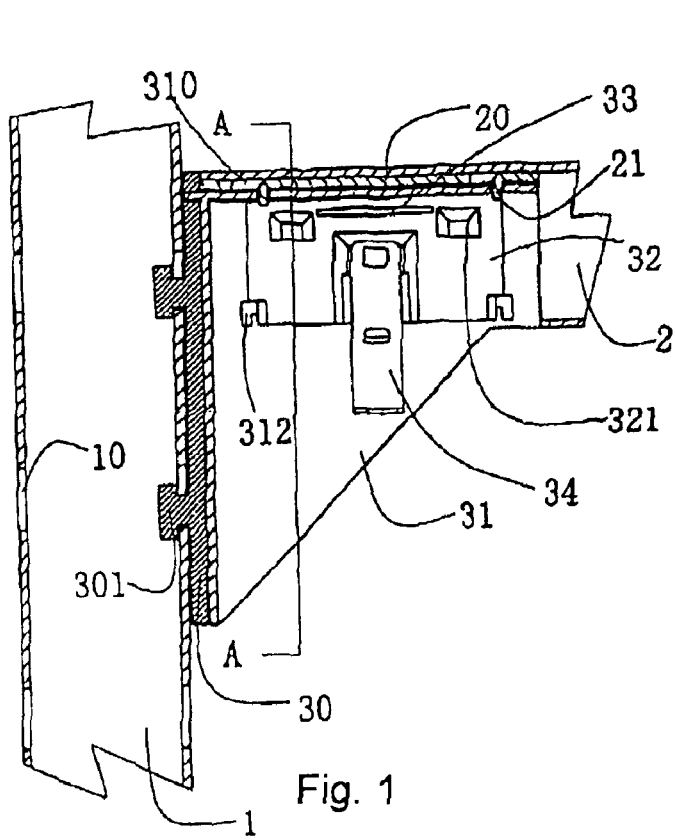
FIG. 1 is the cross sectional schematic view of the upright post and the cross bar of the present invention after being securely joined together via a connecting piece.
Figure 2:
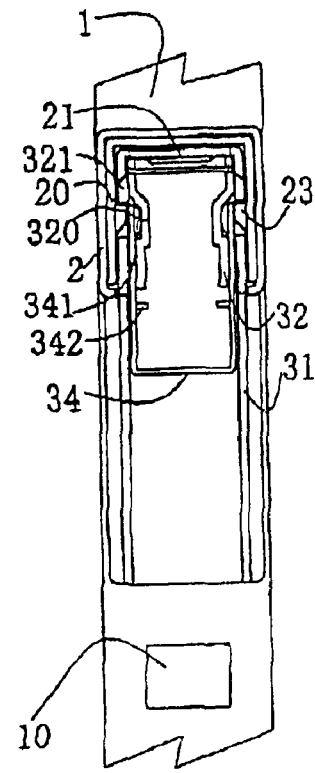
FIG. 2 is the side schematic view of the upright post and the cross bar shown in FIG. 1 after being securely joined together via a connecting piece.
Figure 4:
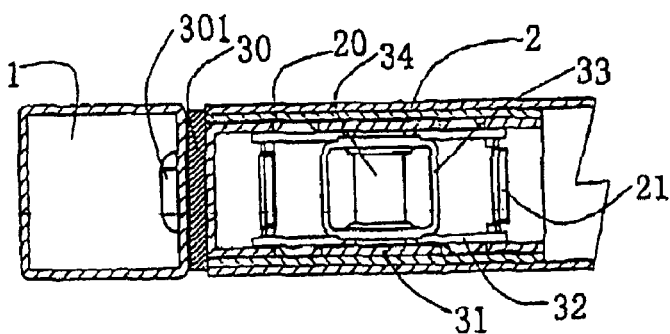
FIG. 4 is the transverse cross sectional schematic view of the upright post and the cross bar shown in FIG. 1 after being securely joined together via a connecting piece.
Figure 3:
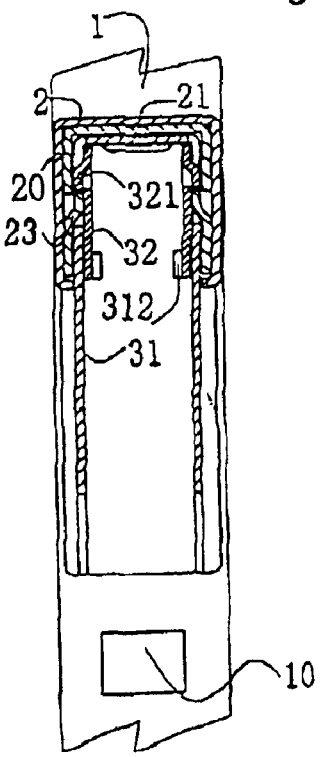
FIG. 3 is cross sectional schematic view of the upright post and the cross bar shown in FIG. 1 along A—A line after being securely joined together via a connecting piece.

As shown in FIGS. 1–4, while assembling the universal rack of the present invention, the retaining plate 32, spring piece 33, push rod 34 must firstly be snapped into the frame 31, afterwards the assembled connecting piece as desired is connected to the upright post 1, i.e. the protrusions 301 on one side of the connecting panel 30 of the connecting piece is snapped into the through-holes 10 provided on the sidewall of the upright post 1, as shown in FIG. 1. Finally, the cross rod 2 is snapped into the connecting piece. At this moment, the protrusions 23 on the interior sidewall of the cross bar 2 is snapped right into the recesses 311 provided on the sidewall of the frame 31, and the two protruding retainers 21 is secured right into the two holes 310 on top of the frame 31 to secure the cross bar 2, thus the cross bars 2 and upright posts 1 can form a storing shelf of all sorts of sizes and shapes. When said storing shelf is needed to be disassembled for moving, the user only needs to pull the push rod 34 for deflect the retaining plate 32 inward, thus the cross bar 2 can be easily removed from the connecting pieces 2, 3, 5, and the connecting pieces can be further taken down from the upright post 1. Then, the dissembled upright posts 1, cross bars 2 and connecting pieces can be moved to the destination and reassembled into a new storing shelf according to the pattern and size of the new room. When reassembling, the excess upright posts 1, cross bars 2 and connecting pieces can be stored for next use.

In conclusion, the universal rack of the present invention has the following advantages:

1. By means of the connecting pieces is interconnecting with the upright posts and the cross bars in the manner of clip and snap connection, the whole universal rack of the present invention can be assembled and secured without any tools or screws for the stability when assembled, and it can be dissembled freely. Meanwhile, upon carrying things of the universal rack, the height of each level can be changed independently.

2. The universal rack of the present invention can be rapidly assembled without the help of other techniques or tools.

3. By replacing with cross rods or upright posts of different lengths, the universal rack of the present invention can be designed into a storing shelf of different patterns.

4. The spare parts dissembled do not have to be abandoned. They can be stored or used in other storing shelves. In addition, the disassembled upright posts and cross bars do not take much space, thus they can save transportation cost and storage space, and can be recycled, which has certain advantage to the environment.

5. The universal rack of the present invention can be commonly used in narrow places, and can be used as storing shelves, demonstration racks, storing racks in factories, production lines, desk in offices, utility shelves and working tables etc.

Moreover, the description as above is intended to illustrate the universal rack of the present invention, but it cannot be used as the protection scope of the present invention. Slightly amendments or modifications are easier to those of skill in the art upon reviewing the above description without departing from the spirit of the invention. Any equivalent transformations and modifications not departing from the design spirit of the present invention would fall into the protection scope of the present invention.

What is claimed is:

1. A universal rack comprising:
    a plurality of hollow tubular upright posts (1) having side walls;
    a plurality of hollow tubular cross bars (2) having opposite ends;
    a plurality of connecting pieces (3, 4, 5) for interconnecting the upright posts (1) to the cross bars (2);
    a plurality of first holes (10) provided on a side wall of each of the upright posts (1);
    each of said cross bars (2) having an inverted U-shaped section at each opposite end thereof, with each inverted U-shaped section having an upper horizontal wall and two parallel side walls aligned vertical to the upper horizontal wall, said inverted U-shaped section further comprising:
    at least one retainer (21) protruding downwardly from said upper horizontal wall; and
    at least one first protrusion (23) extending from each of the side walls;
    with each of said connecting pieces (3, 4, 5) comprising:
    a frame (31) having a top wall and two side walls perpendicular to the top wall;
    a push rod (34) positioned between the two side walls of the frame (31);
    two retaining pieces (32) each between the push rod (34) and said two side walls of the frame (31); and
    a spring piece (33),
    wherein a connecting panel (30, 40, 50) is securely joined to one end of said frame (31) at one side and has a plurality of second protrusions (301, 401, 501) on an opposed side adapted to be snapped into the first holes (10) on said upright post (1), said frame (31) further comprising:
    at least one recess (310) provided on the top wail of said frame (31) so as to engage at least one protruding retainer (21) on said cross bar (2) when said frame (31) engages the cross bar (2):
    second holes (311) each provided on the side walls of said frame (31) so as to engage the first protrusions (23) on said cross bars (2) when said frame (31) engages the cross bar (2);
    bosses (312) inwardly provided on the two side walls of said frame (31) for engaging the retaining piece (32); and
    wherein said retaining piece (32) further comprises:
    third protrusions (321) protrude in an opposite direction with the bosses (312) of said frame (31) so to be snapped into the second holes (311) on said frame (31) when the retaining plate (32) engages with the frame (31);
    a fourth protrusion (320) protruded inwardly at the middle of said retaining plate (32) for holding said push rod (34) by means of the action of the side wall of said frame (31) with the fourth protrusion (320) when each said retaining plate (32) positioned on the side wall of said frame (31) interconnect to each other at the top via the spring piece (33).

2. The universal rack of claim 1, characterized in that screws are provided at the bottom of said upright posts (1) for regulating the height of the universal rack.

3. The universal rack of claim 1, further comprising two said protruding retainers (21) provided on a reinforcing panel (20) welded onto the interior surface of an upper side wall of the cross bar (2).

4. The universal rack of claim 1, characterized in that said connecting panel (30) is a flat panel.

5. The universal rack of claim 1, characterized in that said connecting panel (40) is a L-shaped panel having two arms each connected with one said frame (31) and said second protrusions (301, 401, 501) is on one arm thereof.

6. The universal rack of claim 1, characterized in that said connecting panel (50) is a U-shaped panel having a base and two arms connecting with the end of the base, three said frames (31) connected to said connecting panel (50) with said second protrusions (301, 401, 501) formed on the base.

7. The universal rack of claim 1, characterized in that: said spring piece (33) is a flame-shaped spring piece.

8. The universal rack of claim 1, characterized in that said push rod (34) is U-shaped having a base and two side plates, a pair of opposing fifth protrusions (341) protruding towards each other on each of the side plates for engaging between said first protrusions (23) of said cross bars (2) and a fourth protrusion (320) of said retaining piece (32), and a pair of opposing backstops (342) are provided correspondingly below the two fifth protrusions (341).

9. The universal rack of claim 1, characterized in that said upright posts (1) and cross bars (2) are both square hollow tubes.

10. The universal rack of claim 1, characterized in that said upright posts (1), said cross bars (2) and said connecting pieces (3, 4, 5) are all made of metallic material.

* * * * *